United States Patent
van Wageningen et al.

(10) Patent No.: US 7,843,216 B2
(45) Date of Patent: Nov. 30, 2010

(54) TECHNIQUES FOR OPTIMIZING DESIGN OF A HARD INTELLECTUAL PROPERTY BLOCK FOR DATA TRANSMISSION

(75) Inventors: Darren van Wageningen, Kanata (CA); Curt Wortman, Ottawa (CA); Boon-Jin Ang, Penang (MY); Thow-Pang Chong, Johor (MY); Dan Mansur, Emerald Hill, CA (US); Ali Burney, Fremont, CA (US)

(73) Assignee: Altera Corporation, San Jose, CA (US)

( * ) Notice: Subject to any disclaimer, the term of this patent is extended or adjusted under 35 U.S.C. 154(b) by 23 days.

(21) Appl. No.: 12/193,532

(22) Filed: Aug. 18, 2008

(65) Prior Publication Data

US 2008/0297192 A1  Dec. 4, 2008

Related U.S. Application Data

(62) Division of application No. 11/011,543, filed on Dec. 13, 2004, now Pat. No. 7,434,192.

(51) Int. Cl.
*G06F 7/38* (2006.01)
*H03K 19/173* (2006.01)

(52) U.S. Cl. .................. 326/38; 326/16; 326/41; 326/46

(58) Field of Classification Search .............. None
See application file for complete search history.

(56) References Cited

U.S. PATENT DOCUMENTS 6,879,598 B2 *  4/2005  Zancan et al. ............... 370/463
6,894,530 B1 *  5/2005  Davidson et al. ............ 326/38

* cited by examiner

*Primary Examiner*—Anh Q Tran
(74) *Attorney, Agent, or Firm*—Ropes & Gray LLP (57) ABSTRACT

Techniques are provided for implementing channel alignment for a data transmission interface in an HIP block on a programmable logic integrated circuit. The HIP block channel alignment logic can be run using a reduced number of parallel data paths, which consumes substantially less logic resources. Also, the HIP block channel alignment logic circuits can be processed at the higher HIP core clock rate in serial, decreasing lock latency time. Techniques are provided for implementing error handling for transmitted data in programmable logic circuits. The programmable logic circuits can be configured to implement error generation and error monitoring functions that are tailored for any application. Alternatively, the logic elements can be configured to perform other functions for applications that do not require error handling. The phase skew between data and clock signals on an integrated circuit are reduced by routing clock signals along with the data signals to each circuit block.

13 Claims, 5 Drawing Sheets

TECHNIQUES FOR OPTIMIZING DESIGN OF A HARD INTELLECTUAL PROPERTY BLOCK FOR DATA TRANSMISSION

CROSS-REFERENCES TO RELATED APPLICATIONS

This application is a divisional application of U.S. patent application Ser. No. 11/011,543 filed Dec. 13, 2004, entitled "TECHNIQUES FOR OPTIMIZING DESIGN OF A HARD INTELLECTUAL PROPERTY BLOCK FOR DATA TRANSMISSION," the entire disclosure of which is incorporated by reference for all purposes.

BACKGROUND OF THE INVENTION

The present invention relates to techniques for optimizing design of hard intellectual property blocks that are used for data transmission, and more particularly, to techniques for placing various portions of a data transmission block within a hard intellectual property block or in programmable logic to optimize the design.

The convergence of systems used in LAN, WAN, MAN, and SAN segments require new, interoperable communications technologies. Modular equipment must have flexible architectures that can support multiple protocols, including Ethernet for the LAN, SONET/SDH for the MAN/WAN, and Fiber Channel for the SAN.

System Packet Interface Level 4, Phase 2 (SPI4-2) is an electrical interface specification for complex communications systems. SPI4-2 allows communications systems to transmit multiple communications protocols using variable, high speed, data rates of up to 10 Giga bytes per second (Gbps), including Packet over SONET/SDH (POS), OC-192, Ethernet, Fast Ethernet, Gigabit Ethernet, 10 GbE, and 10G SAN. SPI4-2 enables developers to re-use hardware and software interface solutions from board to board, avoiding the necessity to build proprietary application specific integrated circuits (ASICs) for each communications protocol.

The SPI4-2 interface specification stipulates 16 bit wide transmitter and receiver data paths. The SPI4-2 interface specification also stipulates 2 bit wide FIFO status information is sent and received separately from the corresponding data path. The status information can be sent/received at either $\frac{1}{8}^{th}$ of the SPI4.2 data rate, or at the SPI4.2 data rate (known as 'full rate').

Programmable logic devices (PLDs) are a type of programmable logic integrated circuit. Programmable logic integrated circuits can be configured to perform a variety of logical user functions. Programmable logic integrated circuits also include field programmable gate arrays (FPGAs), programmable logic arrays, configurable logic arrays, etc. Many of today's FPGAs have on-chip non-programmable application specific integrated circuit (ASIC) blocks, which are also called hard intellectual property (HIP) blocks.

SPI4-2 interface circuits align data that is received on 17 channels (16 data and 1 control). A SPI4-2 interface circuit can be implemented in programmable logic circuitry on a FPGA. SPI4-2 channel alignment functions typically consume hundreds of standard programmable logic elements on an FPGA; channel alignment is typically performed in programmable logic on a 128-bit or 64-bit wide data path, which requires numerous logic elements. Therefore, it would be desirable to reduce the amount of circuitry that is used to implement SPI4-2 channel alignment.

In addition, the most logic element conscious designs perform channel alignment serially, one channel at a time. The serial channel alignment methodology adds increased latency time before the channels have aligned, and the SPI4-2 receiver can declare synchronization. Therefore, it would be desirable to reduce the latency time needed to perform channel alignment for SPI4-2 interfaces.

Another problem facing FPGA designers is clock skew. In the past, circuit board designers typically synchronized clock signals that are driven to multiple integrated circuits on a board to reduce clock skew.

Another problem is that FPGA customers handle error conditions differently depending on the system requirements of their particular application. Therefore, it would also be desirable to provide flexible techniques for implementing error detection and error handling on FPGAs.

Within a single integrated circuit, clock signals are typically routed to circuit blocks on an integrated circuit through a clock network. Each node of a clock network is usually driven by different lengths of interconnect wires and driving buffers that introduce skew between clock signals at different nodes. Therefore, there is a need to reduce clock skew on programmable integrated circuits.

BRIEF SUMMARY OF THE INVENTION

The present invention relates to techniques for optimizing design of hard intellectual property blocks that are used for data transmission. The optimization techniques are related to channel alignment, error handling, and clock routing.

According to a first embodiment of the present invention, logic in an HIP block on a PLD performs channel alignment for a data transmission interface. The channel alignment logic in the HIP block substantially reduces the RX lock time latency compared with a standard solution implemented in programmable logic in a PLD. The HIP block channel alignment logic also reduces the amount of logic circuitry needed to implement channel alignment compared with a standard solution implemented in programmable logic in a PLD.

According to a second embodiment of the present invention, error handling for transmitted data is implemented in programmable logic circuitry. Programmable logic elements on a PLD can be configured to implement error detection and error monitoring functions that are tailored for any application. Alternatively, the logic elements can be configured to perform other functions for applications that do not require error handling.

According to a third embodiment of the present invention, the phase skew between data and clock signals on an integrated circuit are reduced by routing clock signals along with the data signals to each circuit block or circuit element.

According to further embodiments of the present invention, FIFO buffers that interface with a data transmission interface HIP block are implemented in programmable logic. The programmable logic implementation for the FIFOs provides flexibility that cannot be achieved on an ASIC chip.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
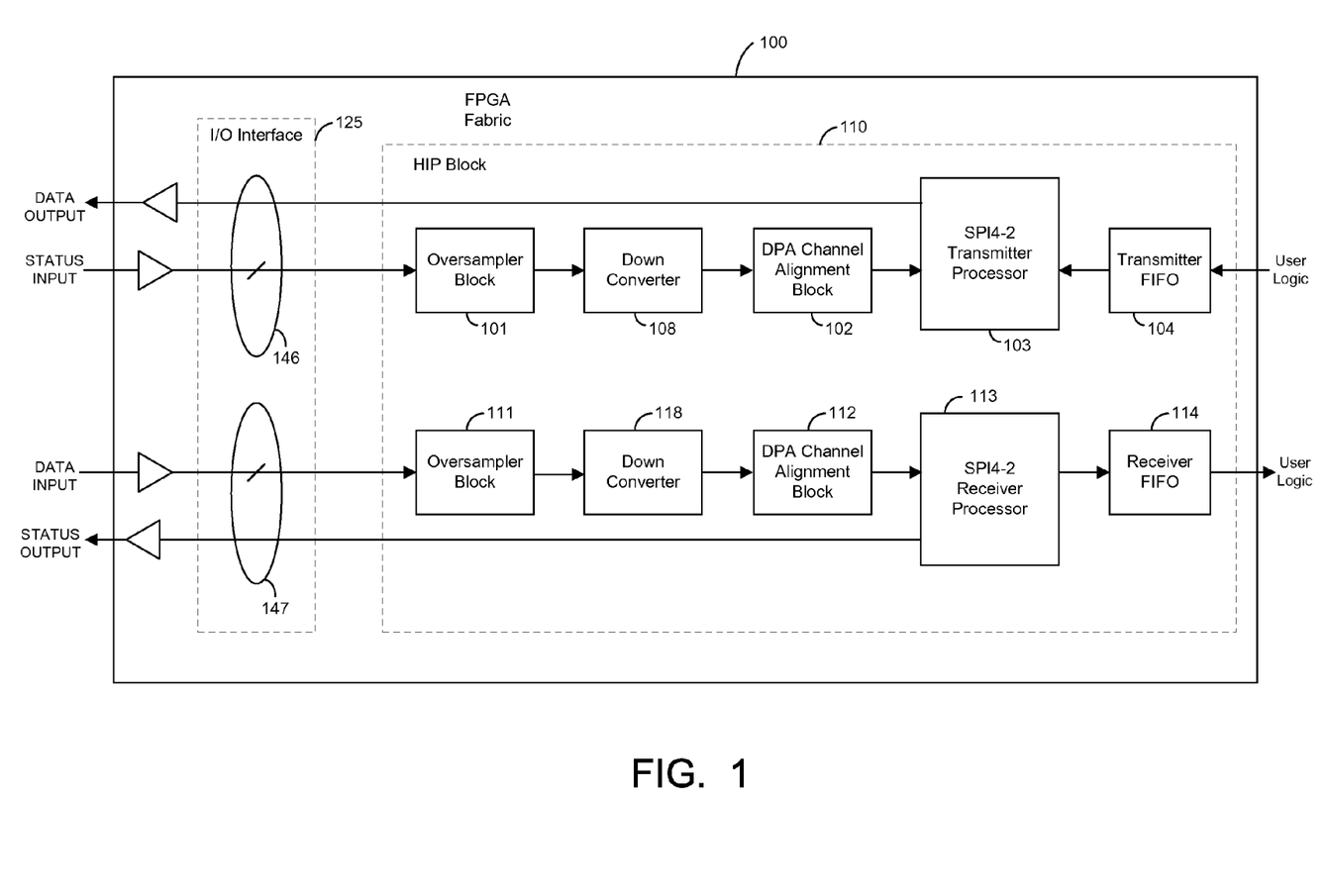
FIG. 1 illustrates a block diagram of a SPI4-2 interface as a HIP block in a programmable logic device that includes a channel alignment block, according to an embodiment of the present invention.

FIG. 1 illustrates a block diagram of a programmable logic device (PLD) 100 that includes a hard intellectual property (HIP) block 110 and a chip input/output interface 125. Input data from an external source is transmitted to input/output interface 125 on PLD 100. HIP block 110 is a SPI4-2 compliant interface for input and output data. According to the present invention, channel alignment for incoming data is performed in hard-wired, application specific circuitry within HIP block 110. HIP block 110 includes oversampler blocks 101 and 111, down converters 108 and 118, DPA channel alignment blocks 102 and 112, transmitter processor 103, receiver processor 113, and first-in-first-out (FIFO) buffers 104 and 114.

I/O interface 125 includes circuits 146 and 147 that can operate as serializers or deserializers. When operating as deserializers, circuits 146 and 147 convert an incoming serial data stream into parallel data streams that are transmitted to oversampler blocks 101 and 111, with the oversampler block 101 handling the full rate status channel traffic, and block 111 handling the SPI4.2 data traffic. Circuits 146 and 147 can also act as serializers. When operating as serializers, circuits 146 and 147 convert parallel data streams from SPI4.2 Transmitter and SPI4.2 Receiver blocks (103 and 113 respectively) into serial data streams that can be transmitted off chip through I/O interface 125.

Circuits 146 and 147 can be configured to operate in a 4:1 deserialization mode or 8:1 deserialization mode. For example, if in 8:1 mode, 16 parallel channel data paths plus 1 control path are input into interface 125 at a 500 MHz double data rate, interface 125 can output data (deserialize) on a parallel 136-bit wide data path at a 125 MHz single data rate. As another example, interface circuits 146 and 147 can serialize a 136-bit wide input data bus into a 16-bit wide data bus plus 1 control path.

Oversampler blocks 101 and 111 eliminate clock skew between the edges of a clock signal received from block 125 and the edges of the input data received from circuits 146 and 147. The clock from block 125 may be routed differently than the data from this block, necessitating the need for the oversampler block. HIP block 110 also includes down converter blocks 108 and 118. The data output paths of oversampler blocks 101 and 111 are coupled to inputs of down converters 108 and 118.

A HIP block on an FPGA typically operates at a higher clock frequency than the programmable logic, because the programmable routing resources have longer routing delays than connecting wires in a HIP block. HIP block 110 uses a clock signal that has a faster clock frequency (e.g., 500 MHz) than the frequency of the clock signal received from block 125 (e.g., 125 MHz). Interface block 125 outputs the data at the slower clock frequency. Down converters 108 and 118 re-clock the input data at the faster clock frequency of HIP block 110 on a smaller number of parallel data paths.

For example, down converter block 118 can convert 128-bit wide parallel input data buses into 32-bit wide parallel data buses. The other down converter block (108) is used in a full rate status channel embodiment, which can convert 16-bit wide parallel input status data buses into 4-bit wide parallel status data buses. In these examples, down converter blocks 108 and 118 reduce the number of parallel data paths by 4 times. The output data buses of down converters 108 and 118 are coupled to the inputs of DPA Channel alignment blocks 102 and 112, respectively.

Channel alignment blocks 102 and 112 contain logic circuits that perform byte and channel alignment for each parallel data path or full rate status data path channels. Channel alignment is a function that is required to comply with the SPI4-2 interface protocol specifications.

Channel alignment blocks 102 and 112 process the reduced number of parallel data paths generated by down converters 108 and 118. As a result, channel alignment blocks 102/112 use less logic resources to perform the channel alignment functions than a comparable solution at 64-bits or 128-bit wide data path in programmable logic. For example, the channel alignment blocks can receive a 32-bit wide data path plus a 2-bit control path, consuming at least 4 times less logic resources than a 128-bit data path plus an 8-bit control path solution implemented standard programmable logic circuits.

In general, HIP/ASIC blocks are able to implement logic functions more efficiently, using less logic circuit resources, than programmable logic circuits. Because channel alignment blocks 102 and 112 are hard-wired into HIP block 110, there is no need for channel alignment blocks to be implemented in programmable logic elements. Implementing channel alignment in an HIP block technique also frees up a substantial amount of programmable logic circuits on the IC that would normally be required to implement channel alignment function. The extra programmable logic resources can then be used for other user functions.

Channel alignment blocks 102 and 112 analyze input data streams from down converters 108 and 118, respectively, to locate specific data byte patterns referred to as a training pattern. In general, a training pattern is used to ensure that a transition occurs (from logic 1 to 0, or 0 to 1) so that a PLL does not lose lock when a system contains non-transitioning data. The training pattern is also used to de-skew the data bus, for byte or word alignment. The training pattern may also indicate the start of a data frame in the input data stream. Channel alignment blocks 102 and 112 align corresponding data bits between the different input data channels using a well known bit slipping technique.

Due to board layout trace length differences, temperature variations, noise, or other phenomenon, corresponding bits on parallel data input channels may be received at different times. For example, a bit on channel 1 may be received one bit ahead of a corresponding bit on channel 2. Channel alignment blocks 102 and 112 determine whether corresponding bits in the data channels are in the same bit positions.

If corresponding bits are not in the same bit positions, channel alignment blocks 102 and 112 perform a bit slipping technique using a DPA macro from circuits 146 and 147 to align the data bits into the same bit positions. Blocks 102/112 can shift data bits received in one or more of the channels, until all of the corresponding bits on the parallel channels occur at the same bit positions. Channel alignment blocks 102 and 112 transmit aligned data on the parallel data channels to processors 103 and 113, respectively.

The techniques of the present invention substantially reduce the amount of logic circuitry needed to implement channel alignment on parallel data transmission paths. HIP block channel alignment logic circuits can be run at the higher clock frequency of the HIP block, processing each channel in parallel, and decreasing lock latency time. The HIP block channel alignment blocks take advantage of the smaller data-path width to align the channels using a parallel algorithm. This contrasts with a solution implemented in programmable logic, which due to static timing results requires more logic resources because a wider data-path width is required. The programmable logic solution may also require a solution to align the channels one at a time serially, increasing the alignment lock time.

The techniques of the present invention are not limited to SPI4-2 interface HIP blocks. The present invention also applies to performing channel alignment within any HIP block that is designed to operate as a data transmission interface block.

Figure 2:
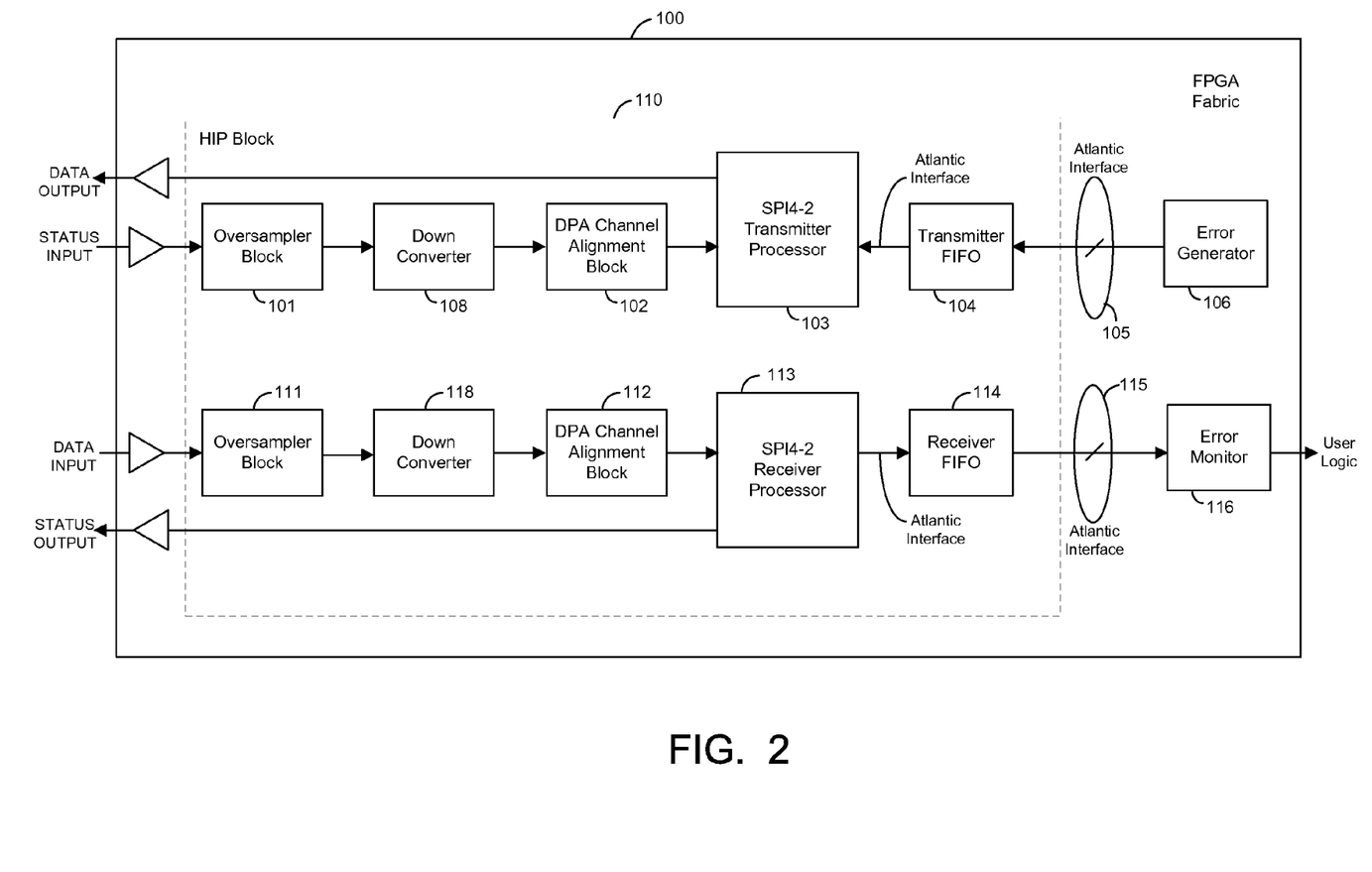
FIG. 2 illustrates a block diagram of a programmable logic integrated circuit with a SPI4-2 interface HIP block and programmable logic circuits that implement error handling features, according to an embodiment of the present invention.

FIG. 2 illustrates a block diagram that shows further details of integrated circuit (IC) 100. Specifically, IC 100 includes error generator 106, error monitor 116, and Atlantic interfaces 105 and 115.

Transmitter processor 103 receives data packets from transmitter FIFO 104 via an Atlantic interface. An Atlantic interface is a flexible interface protocol for packet-oriented data of arbitrary length. An Atlantic interface provides a consistent interface between Intellectual Property (IP) cores for easy integration in a System On a Programmable chip (SOPC). An Atlantic interface provides synchronous point-to-point connection and high throughput with flexible control. An Atlantic interface also provides a scalable clock frequency and a scalable data path width.

The Atlantic interface is merely one type of interface that can be used to transmit data between a HIP block and error handling blocks according to the techniques of the present invention. Other types of interfaces can also be used to allow the HIP block and the error handling blocks to communicate with each other.

Transmitter 103 encodes packets of data received from FIFO 104 into a SPI4-2 compatible data protocol and transmits the encoded data on parallel data channels, for transmission off-chip.

Receiver processor 113 receives SPI4-2 compatible data packets from channel alignment block 112 on parallel data channels. Receiver 113 extracts the data packets from the data stream and transmits the extracted data to FIFO buffer 114 via an Atlantic interface.

According to one specific embodiment, FIFO 114 deserializes data output from processor 113 to provide a larger number of parallel data output streams that are clocked at lower frequency. For example, FIFO 114 can convert 32 parallel data streams output by processor 113 clocked at 500 MHz into 128 parallel data streams that can be read out by user logic at a slower frequency (e.g., 125 MHz). FIFO 104 can serialize data streams that are received from interface 105. For example, FIFO 104 can convert 128 parallel data streams clocked at 125 MHz into 32 parallel data streams clocked at 500 MHz that are provided to processor 103. Thus, FIFO blocks 104 and 114 temporarily store data bytes that are transmitted between processors 103 and 113 and interfaces 105 and 115, respectively. The FIFO blocks 104 and 114 can be used for bus width adaptation and for crossing clock domains between the HIP block 110 and the user logic coupled to the Atlantic interface 105 and 115, as it is typically unrealistic for the user logic to operate at the internal HIP Atlantic data bus width and frequency.

FIG. 2 also illustrates error generator block 106, error monitor block 116, connected to HIP block 110 via the Atlantic interface (at 105 and 115). Atlantic interface 105 and 115 contain circuitry that interfaces between HIP block 110 and error handling blocks 106 and 116. Atlantic interfaces are also present between FIFO 104 and processor 103 and between FIFO 114 and processor 113.

Error monitor block 116 performs various error handling functions with respect to data bytes that are transmitted to and from HIP block 110. Error monitor block 116 detects errors in data bytes that are output from interface 115 using an error detection scheme. Error monitor block 116 may also perform correction on the data in response to an error. Error monitor block 116 can be running to detect errors in a user mode and during an IC test mode. The user mode occurs when IC 100 is operating according to a user-configured design. Typically, the error generator block is only present in IC test mode, while the error monitor block is present in any mode.

Error generator block 106 can generate error bytes (e.g., polarity errors) for testing and debugging purposes. Transmitter 103 can inject error bytes generated by block 106 into the SPI4-2 output data stream. The error bytes injected into the data stream can be subsequently extracted and analyzed for a variety of different testing and debugging purposes (e.g., to test the functioning of various circuits). Generally, error bytes generated in block 106 are purposely injected into the output data stream only during an IC test mode.

Error generator block 106 and error monitor block 116 are implemented in programmable logic circuits within the programmable gate array of the FPGA fabric on integrated circuit 100. Thus, general-purpose programmable logic circuits are configured to perform the functions of error generator block 106 and error monitor block 116. Error generator block 106 and error monitor block 116 can utilize memory to store the per port context.

By implementing error generator 106 and error monitor 116 in programmable logic circuits, a user of IC 100 is free to configure IC 100 to implement any error handling or error generating functions that the user desires. Different users of IC 100 often have different requirements for handling errors in data transmitted to and from a SPI4-2 interface such as HIP block 110. For example, some applications for IC 100 do not require that errors in the data stream be corrected in circuitry on IC 100. As another example, different applications correct different types of errors using different error correction methods. Using yet another example, different users have different requirements for handling Missing End of Packet (MEOP) and Missing Start of Packet (MSOP) errors.

Therefore, it would be a waste of logic circuits to program error generator 106 and error monitor 116 into a hard-wired ASIC circuit block such as HIP block 110. The technique of FIG. 2 provides users of IC 100 with increased flexibility. If error blocks 106 and 116 were part of HIP block 110, they would have to be designed to perform specific error handling functions that may not be used in a particular user design for IC 100.

The techniques of the present invention can also be applied to other types of hard intellectual property (HIP) blocks that are not SPI4-2 interfaces. Error handling functions can be implemented in programmable logic rather than hard-wired into circuitry on an ASIC block. This technique provides users with increased flexibility for error handling functions such as error generation and error monitoring. The present invention also includes techniques for implementing error correction functions within programmable logic.

Another embodiment of the present invention reduces the phase skew between clock signals and data signals routed on an integrated circuit. This embodiment of the present invention applies to any type of integrated circuit (e.g., a PLD, an FPGA, or an ASIC).

Figure 3A:
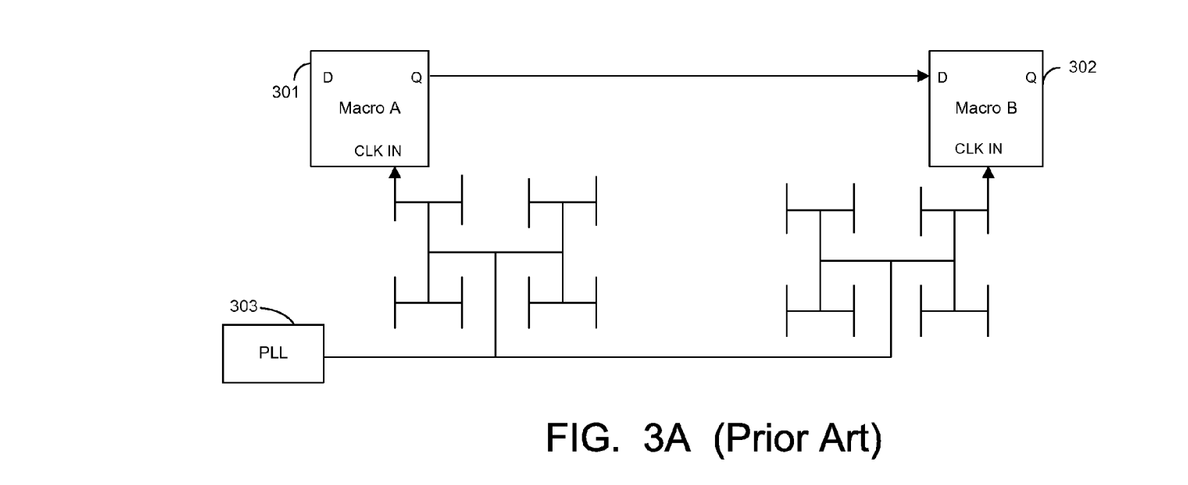
FIG. 3A illustrates a prior art clock network.

Clock signals are typically generated from a phase locked loop (PLL) and routed to circuit elements on an integrated circuit through a clock network. FIG. 3A illustrates an example of a prior art clock network and PLL 303. Macros 301 and 302 are coupled to receive a clock signal at different nodes of the clock network. Each node of the clock network is driven by different lengths of interconnect wires and driving buffers that introduce skew between the clock signals received at different nodes of the clock network.

Figure 3B:
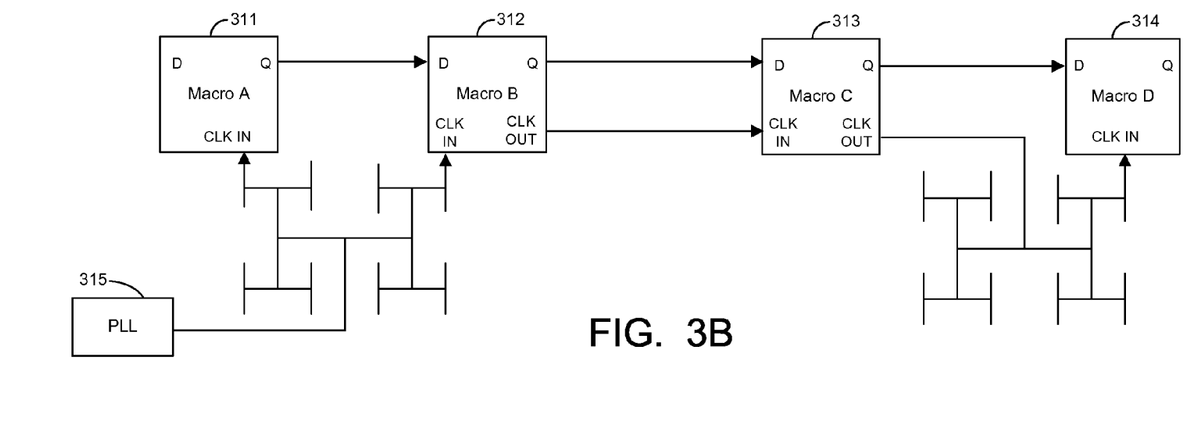
FIG. 3B illustrates a technique for reducing the skew between data and clock signals on an integrated circuit according to another embodiment of the present invention.

FIG. 3B illustrates an embodiment of the present invention. Macros 311-314 are examples of circuit blocks. Macro 311 drives a data output signal from its Q output to the D input of macro 312. Macro 312 drives its data output to macro 313, and macro 313 drives its data output to macro 314.

PLL 315 generates a clock signal that is driven through a first clock network to clock inputs of macros 311 and 312. Macro 312 contains an output buffer that drives the input clock signal from the first clock network to the clock input of macro 313. Macro 313 also contains a buffer that drives the input clock signal from its clock output to a second clock network. A clock input of macro 314 is coupled to receive a clock signal on the second clock network.

The embodiment of FIG. 3B reduces the phase skew between the data signal and the clock signal, because the clock signal is driven along with the data signal from macro 312 to macro 313. Because the data signal and the clock signal travel paths that are the same or similar lengths, skew between the data and clock signals is substantially reduced.

According to another embodiment, a clock signal is forwarded along with a data signal to an array of logic elements in a FPGA from a macro such as a HIP block implemented in either standard cell or gate array architecture. The forwarded clock links to the clock network to minimize skew when transferring data from the HIP macro to the logic element array. According to further embodiments, two, three, four, five or any number of clock signals can be driven between macros along with data signals to reduce skew.

Because the clock signals are driven from the HIP blocks, data signals can be seamlessly transferred with minimized silicon area. The work of stretching data signals to compensate for duty cycle distortion and jitter is reduced. The capability of driving clocks out from a HIP block onto the clock networks solves some issues with phase differences.

For debug/status information common from HIP blocks, a clock can be sent out of an HIP block at half speed with a derived clock; the HIP block takes advantage of running its logic at a much higher frequency than the PLD. Communication between the HIP and PLD should be at a frequency that the PLD can easily support. Typically, the HIP block runs at twice the clock frequency of the PLD, because the HIP logic functions can be optimized for less delay with smaller cell geometry. This embodiment can also remove the need for a phase compensation FIFO and extra latency in HIP block designs.

Figure 4A:
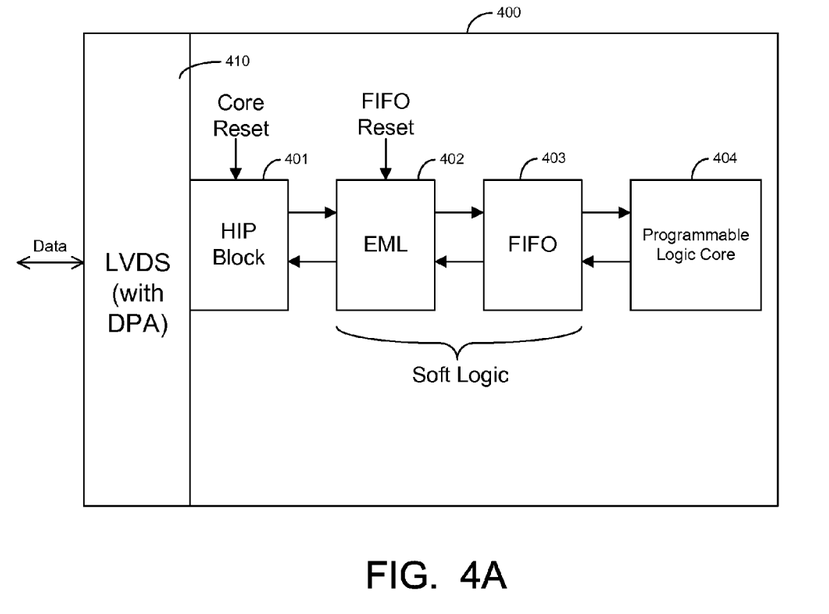
FIGS. 4A-4B illustrates further embodiments of the present invention in which FIFO buffers implemented in programmable logic interface with an HIP block.

FIG. 4A illustrates a further embodiment of the present invention. FPGA 400 includes an I/O interface 410 that is compatible with low voltage differential signaling (LVDS) and has dynamic phase alignment (DPA). FPGA 400 also includes HIP block 401, an error marking logic block (EML) 402, and FIFO buffer 403. HIP block 401 is a SPI4.2 data interface.

EML 402 performs error handling functions, such as error monitoring and error generation. EML 402 can also mark errors on a per port basis. EML 402 is implemented by programmable logic circuits (soft logic), as discussed above with respect to FIG. 2.

FIFO buffer 403 stores data transmitted between HIP block 401 and programmable logic core 404. FIFO buffer 403 is also implemented by programmable logic circuits (soft logic). Because FIFO buffer 403 is implemented in soft logic, a customer can dynamically change the size of the FIFO, while FPGA 400 is in operation. This is difficult to do in a non-FPGA implementation.

Figure 4B:
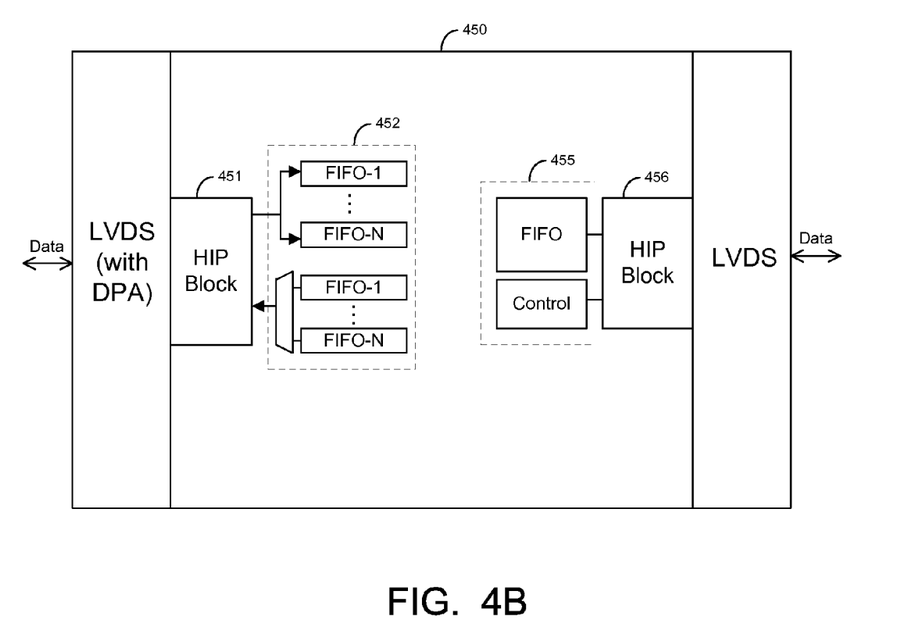

FIG. 4B illustrates yet another embodiment of the present invention. FPGA 450 includes SPI4.2 HIP blocks 451 and 456, buffer manager 455, and FIFO buffers 452. FPGA 450 includes two sets of LVDS I/O ports for sending and receiving data. HIP blocks 451 and 456 interface with the I/O ports to transmit data to and from external devices.

FIFO buffers in block 452 are independent FIFO buffers that can support data transmitted along one or more channels. Each FIFO buffer in block 452 stores data in only one of the data channels. A first set of N FIFO buffers in block 452 stores input data transmitted from HIP block 451 on N channels. A second set of N FIFO buffers in block 452 stores output data before it is transmitted to HIP block 451 on N channels via a multiplexer.

Buffer manager 455, on the other hand, contains a single FIFO buffer that contains enough storage space to store data for multiple channels of data that are transmitted to and from HIP block 456. For example, buffer manager 455 can store data for 256 separate channels in the FIFO. Buffer manager 455 also includes a control block that controls reading and writing of data to the FIFO buffer. The control block ensures that the data channels remain separate when they are stored in and read from the FIFO.

Because the FIFO buffers of FIG. 4B are implemented in programmable logic, an FPGA user can configure the FIFO buffers to be implemented as shown in block 452, as shown in buffer manager 455, or in numerous other ways. The present invention provides a user with increased flexibility in terms of how to implement the FIFO buffers. Such flexibility cannot be easily provided in an ASIC chip.

Figure 5:
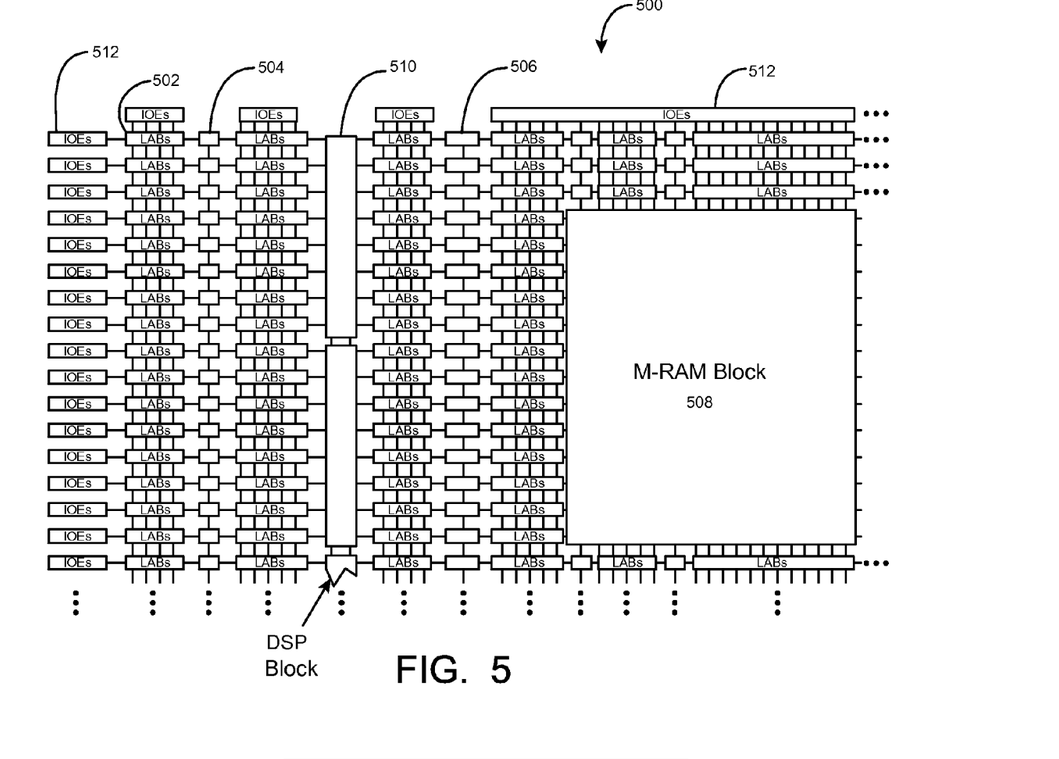
FIG. 5 is a simplified block diagram of a programmable logic device that can be used with the techniques of the present invention.

FIG. 5 is a simplified partial block diagram of one example of PLD 500 that can include aspects of the present invention. Although the present invention is discussed primarily in the context of PLDs and FPGAs, it should be understood that the present invention can be applied to numerous types of programmable integrated circuits. PLD 500 is an example of a programmable integrated circuit in which techniques of the present invention can be implemented. PLD 500 includes a two-dimensional array of programmable logic array blocks (or LABs) 502 that are interconnected by a network of column and row interconnects of varying length and speed. LABs 502 include multiple (e.g., 10) logic elements (or LEs).

An LE is a programmable logic block that provides for efficient implementation of user defined logic functions. PLD has numerous logic elements that can be configured to implement various combinatorial and sequential functions. The logic elements have access to a programmable interconnect structure. The programmable interconnect structure can be programmed to interconnect the logic elements in almost any desired configuration.

PLD 500 also includes a distributed memory structure including RAM blocks of varying sizes provided throughout the array. The RAM blocks include, for example, 512 bit blocks 504, 4K blocks 506 and a block 508 providing 512K bits of RAM. These memory blocks can also include shift registers and FIFO buffers.

PLD 500 further includes digital signal processing (DSP) blocks 510 that can implement, for example, multipliers with add or subtract features. I/O elements (IOEs) 512 located, in this example, around the periphery of the device support numerous single-ended and differential I/O standards. It is to be understood that PLD 500 is described herein for illustrative purposes only and that the present invention can be implemented in many different types of PLDs, FPGAs, and the like.

Figure 6:
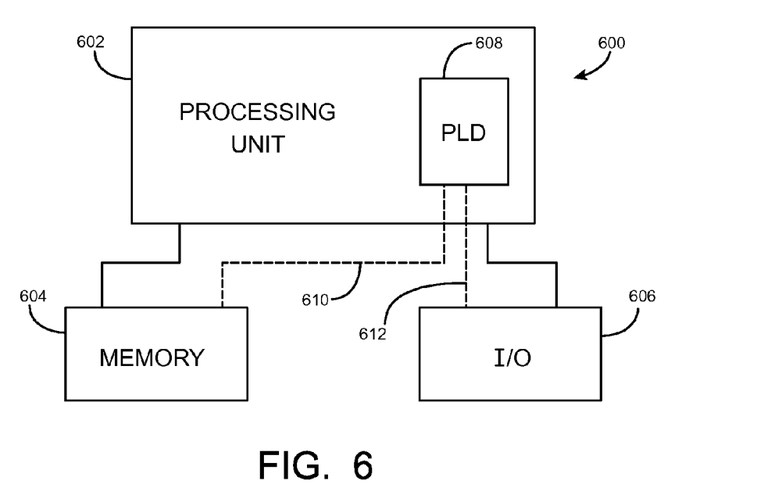
FIG. 6 is a block diagram of an electronic system that can implement embodiments of the present invention.

While PLDs of the type shown in FIG. 5 provide many of the resources required to implement system level solutions, the present invention can also benefit systems wherein a PLD is one of several components. FIG. 6 shows a block diagram of an exemplary digital system 600, within which the present invention can be embodied. System 600 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 600 can be provided on a single board, on multiple boards, or within multiple enclosures.

System 600 includes a processing unit 602, a memory unit 604 and an I/O unit 606 interconnected together by one or more buses. According to this exemplary embodiment, a programmable logic device (PLD) 608 is embedded in processing unit 602. PLD 608 can serve many different purposes within the system in FIG. 6. PLD 608 can, for example, be a logical building block of processing unit 602, supporting its internal and external operations. PLD 608 is programmed to implement the logical functions necessary to carry on its particular role in system operation. PLD 608 can be specially coupled to memory 604 through connection 610 and to I/O unit 606 through connection 612.

Processing unit 602 can direct data to an appropriate system component for processing or storage, execute a program stored in memory 604 or receive and transmit data via I/O unit 606, or other similar function. Processing unit 602 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLDs 608 can control the logical operations of the system. In an embodiment, PLD 608 acts as a reconfigurable processor, which can be reprogrammed as needed to handle a particular computing task. Alternately, programmable logic device 608 can itself include an embedded microprocessor. Memory unit 604 can be a random access memory (RAM), read only memory (ROM), fixed or flexible disk media, PC Card flash disk memory, tape, or any other storage means, or any combination of these storage means.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A programmable logic integrated circuit comprising:
    a programmable logic portion comprising programmable logic circuits; and
    a hard intellectual property (HIP) block comprising a transmitter that encodes packets of data into a data protocol, and a receiver that extracts data packets from a data stream that is encoded in the data protocol,
    wherein the programmable logic circuits are configurable to implement error handling functions for the data processed by the transmitter and the receiver.

2. The programmable logic integrated circuit according to claim 1 wherein the HIP block includes a first FIFO buffer coupled to inputs of the transmitter, and a second FIFO buffer coupled to outputs of the receiver.

3. The programmable logic integrated circuit according to claim 2 wherein a first set of the programmable logic circuits are configurable to function as an error generator that transmits errors to the first FIFO buffer, and a second set of the programmable logic elements are configurable to function as an error monitor that receives data packets from the second FIFO buffer.

4. The programmable logic integrated circuit according to claim 3 wherein the HIP block further comprises a first channel alignment block coupled to inputs of the transmitter, and a second channel alignment block coupled to inputs of the receiver.

5. The programmable logic integrated circuit according to claim 4 wherein the HIP block further comprises a first down converter coupled to inputs of the first channel alignment block, and a second down converter coupled to inputs of the second channel alignment block.

6. The programmable logic integrated circuit according to claim 1 further comprising an input/output interface that receives data from off-chip and generates two sets of parallel data channels that are transmitted to the HIP block.

7. The programmable logic integrated circuit according to claim 6 wherein the input/output interface is operable as a serializer and a deserializer.

8. The programmable logic integrated circuit according to claim 1 wherein the transmitter encodes packets of data into a SPI4-2 data protocol, and the receiver that extracts data packets from a data stream that is encoded in the SPI4-2 data protocol.

9. The programmable logic integrated circuit according to claim 3 further comprising a first data interface coupled between the first FIFO buffer and the error generator, and a second data interface coupled between the second FIFO buffer and the error monitor.

10. The programmable logic integrated circuit according to claim 1 wherein the programmable logic integrated circuit is part of a system that includes a processing unit.

11. A method for handling errors in a hard intellectual property block on a programmable logic integrated circuit, the method comprising:
    encodes packets of data into a data protocol for transmission off chip using a transmitter;
    extracting data packets from a data stream using a receiver, the data stream being encoded in the data protocol; and
    implementing error handling functions for the data processed by the transmitter and the receiver using programmable logic circuits.

12. The method defined in claim 11 wherein the transmitter encodes the packets of data into a SPI4-2 data protocol, and the receiver extracts the data packets from the data stream that is encoded in the SPI4-2 data protocol.

13. The method defined in claim 11 wherein implementing the error handling functions further comprises generating errors that are transmitted to a first FIFO buffer, and monitoring errors in data packets received from a second FIFO buffer.

* * * * *